No. 608,276. Patented Aug. 2, 1898.
E. STORM.
THILL COUPLING.
(Application filed Jan. 27, 1898.)
(No Model.) 3 Sheets—Sheet 1.
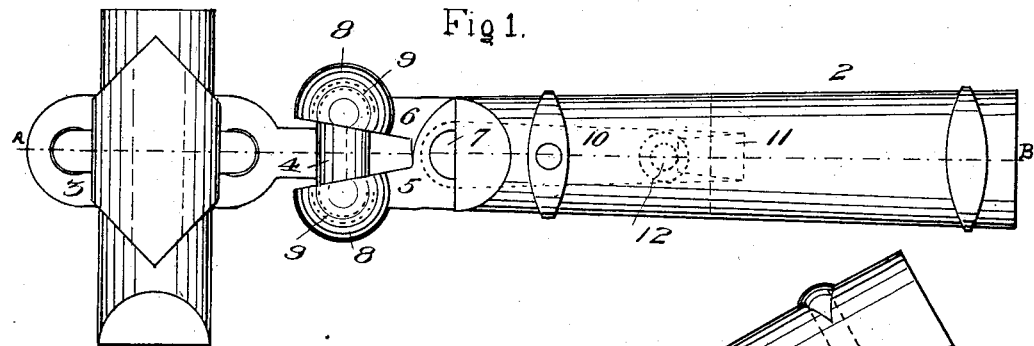
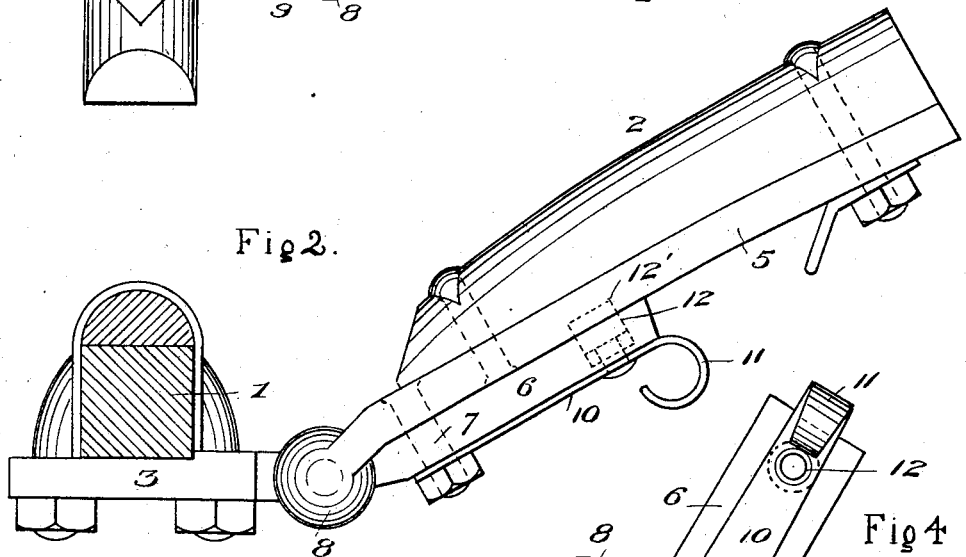
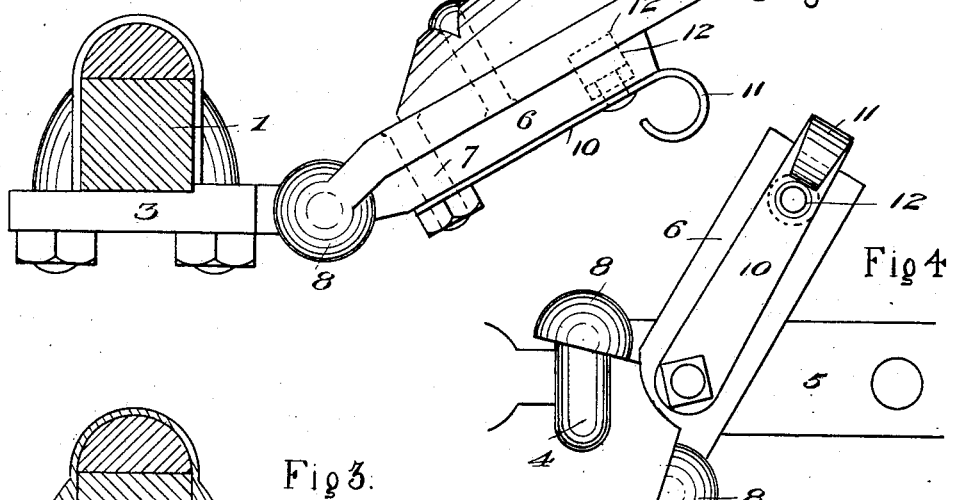
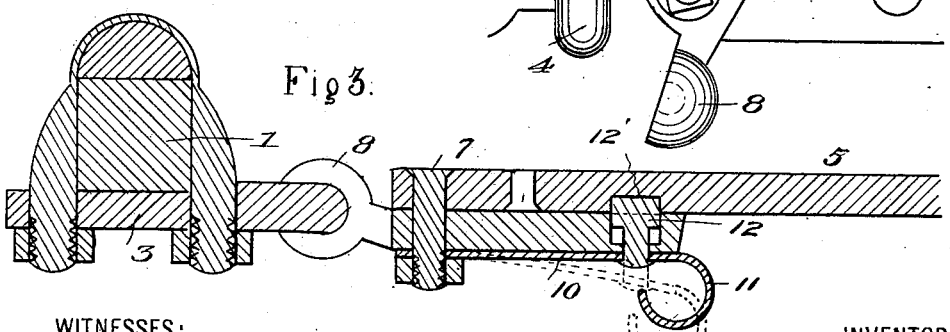
WITNESSES:
INVENTOR
Edward Storm
BY
ATTORNEY No. 608,276. Patented Aug. 2, 1898.
E. STORM.
THILL COUPLING.
(Application filed Jan. 27, 1898.)
(No Model.) 3 Sheets—Sheet 2.
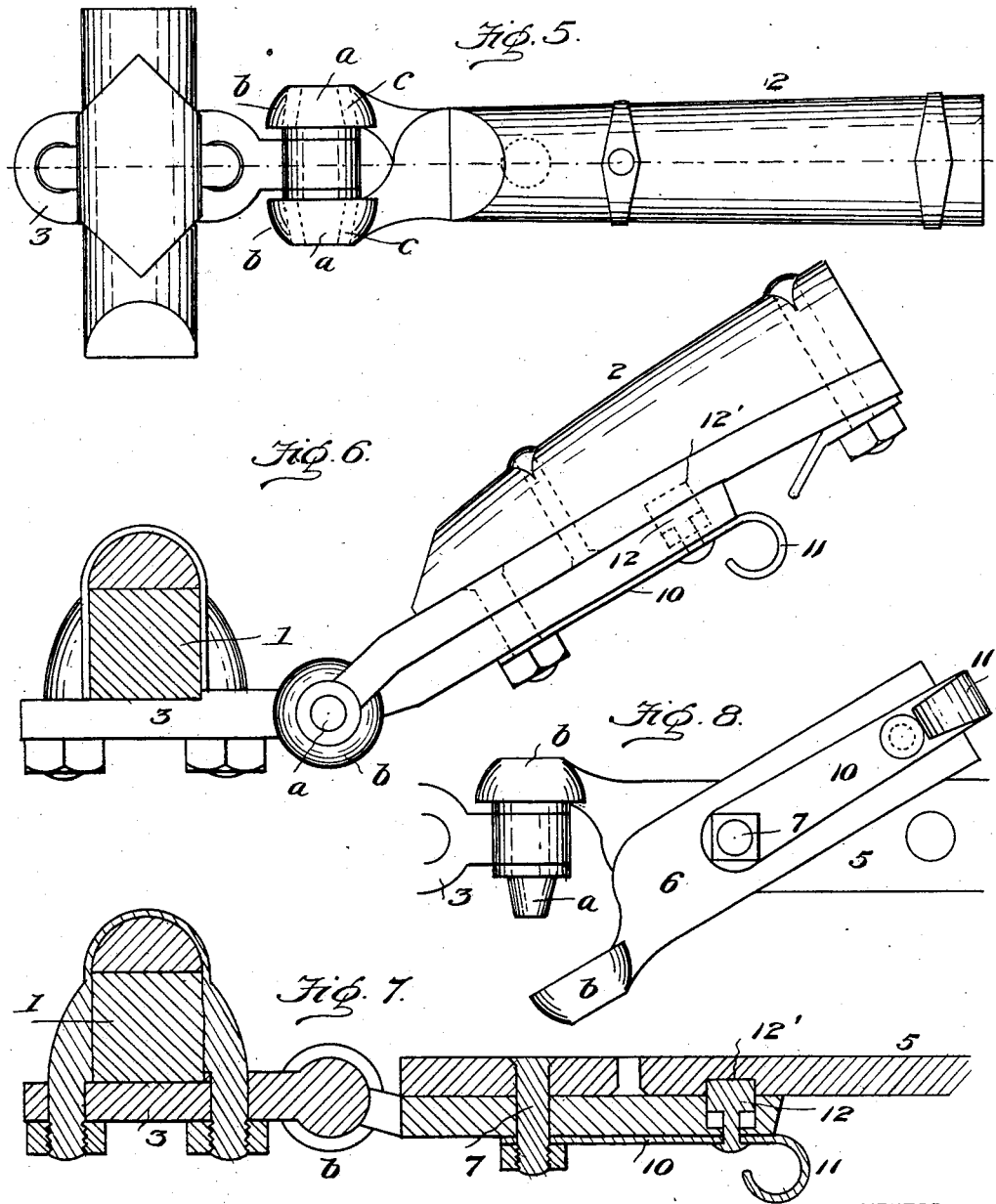
WITNESSES:
INVENTOR
Edward Storm.
BY Benj. E. Cowl.
ATTORNEY No. 608,276. Patented Aug. 2, 1898.
E. STORM.
THILL COUPLING.
(Application filed Jan. 27, 1898.)
(No Model.)
3 Sheets—Sheet 3.
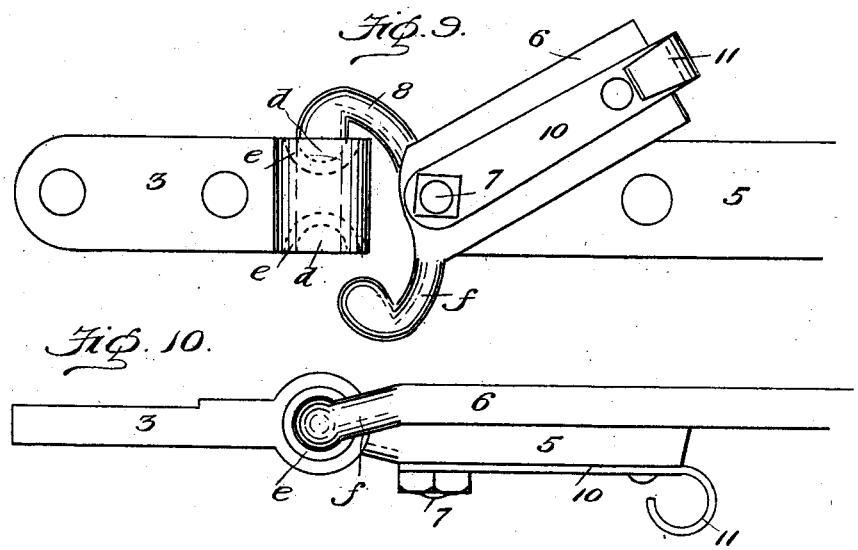
WITNESSES:
INVENTOR
Edward Storm.
BY
ATTORNEY

UNITED STATES PATENT OFFICE.

EDWARD STORM, OF POUGHKEEPSIE, NEW YORK.

THILL-COUPLING.

SPECIFICATION forming part of Letters Patent No. 608,276, dated August 2, 1898.

Application filed January 27, 1898. Serial No. 668,161. (No model.)

*To all whom it may concern:*

Be it known that I, EDWARD STORM, a citizen of the United States, residing at Poughkeepsie, in the county of Dutchess and State of New York, have invented certain new and useful Improvements in Thill-Couplings; and I do declare the following to be a full, clear, and exact description of the invention, such as will enable others skilled in the art to which it appertains to make and use the same.

The invention relates to thill-couplings of the "antirattler" type.

The object of the invention is to provide a simple, strong, and inexpensive device of this character by means of which the thills may be easily and quickly attached to and removed from the axle.

With this object in view the invention consists in certain features of construction and combination of parts, which will be hereinafter fully described and claimed.

In the accompanying drawings, in which I have shown the preferred embodiment of my invention, Figure 1 is a top plan view of one form of my invention, showing the thill attached to the axle. Fig. 2 is a side elevation of the same. Fig. 3 is a longitudinal sectional view. Fig. 4 is a bottom plan view showing one jaw of the coupling swung outward in the act of uncoupling. Fig. 5 is a top plan view of another form of my invention. Fig. 6 is a side elevation. Fig. 7 is a longitudinal sectional view. Fig. 8 is a bottom plan view showing one of the jaws swung outward. Fig. 9 is a bottom plan view of another form of my invention, and Fig. 10 is a side elevation.

Referring to Sheet 1 of the drawings, 1 denotes the axle, and 2 the shaft.

3 denotes a clip-plate clipped to the axle and provided with solid lugs 4, the ends of which are preferably rounded or tapered, as shown.

To the inner end of the thill is bolted or otherwise fixedly secured one member 5 of the "shear-levers," so termed for the reason of their resemblance in manner of connection to the ordinary shears. The other member 6 is pivoted intermediate its length to the member 5 by a bolt 7, and each member at its inner end is provided with a short sleeve-bearing 8, provided with a bushing, as shown in dotted lines at 9 in Fig. 1, preferably of leather. These bearings are clamped to the lateral lugs, so as to permit of a free swinging movement of the thills by any suitable means capable of quick and easy adjustment and preferably by the means shown. These means comprise a spring 10, one end of which is secured in place by the bolt 7 and the other end of which is turned to form a finger-push 11. Secured to the spring near its outer end is the shank of a locking-stud 12, which projects through the lower member 6 and is adapted to engage a seat or socket 12' in the lower face of the upper member 5. This constitutes the fastening means whereby the bearings are clamped to and held in locked position with the lateral studs. When the thill is thus coupled to the axle, it will have a free noiseless movement incident to the motion of the animal, while at the same time it may be easily and quickly removed when occasion demands.

Referring to Sheet 2 of the drawings, I have shown the lateral lugs $a\,a$ tapering their entire length and the bearing-sleeves $b\,b$ open at each end. These sleeves are provided with bushings $c\,c$, preferably of leather, and shown in dotted lines in Fig. 5. The advantage of this construction is that the bushings are not so apt to be compressed and lose their efficiency, for the reason that the ends of the lugs do not come in contact with the bushings and hammer them against the ends of the bearings, as in the construction shown on Sheet 1 of the drawings. As the other parts of the coupler last described are the same as those first described, they are correspondingly indicated by reference characters, and further description is not deemed necessary as to operation.

Figs. 9 and 10 of the drawings show another form of my invention, which is simply a reversal of the form shown in Figs. 1, 2, 3, and 4—*i. e.*, the clip-plate is provided with the bearings $d\,d$, bushings $e\,e$, and the shear-levers with the lateral solid lugs $f\,f$. The operation, however, is the same, and further description will not be required.

From the foregoing description, taken in connection with the accompanying drawings, the construction and operation of my invention will be readily understood and appreciated. The device is exceedingly simple, effects a positive and sure connection, and insures against rattling.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

1. In combination, a clip and pivoted levers provided with coacting lugs and sleeves, one of said levers being provided with a spring-plate and a locking-stud, and the other with a seat or socket for receiving the locking-lug, substantially as set forth.

2. In combination, a clip and pivoted levers provided with coacting lugs and bushed sleeves, said sleeves open at both ends, and a spring, one end of which is provided with a finger-push, a locking-lever projecting through the lower pivoted member of said shear-levers and engaging the upper member of said shear-levers for locking said sleeves to the lugs, substantially as set forth.

3. In combination, a clip-plate and a lever, the one being provided with a lug and the other with a bearing-sleeve for the lug, a spring, one end of which is secured in place by a bolt, the other end being provided with a finger-push, a locking-stud projecting through the lower pivoted member of the shear-levers, and engaged with the upper member of said shear-levers, substantially as set forth.

4. In combination, a clip-plate, and the shear-levers provided with coacting lugs, and sleeves, said levers being pivoted together intermediate of their length, a spring one end of which is secured in place by a bolt, the other end being provided with a finger-push, a locking-stud projecting through the lower pivoted member of said shear-levers and engaged with the upper member of said shear-levers, substantially as set forth.

In testimony whereof I have hereunto set my hand in presence of two subscribing witnesses.

EDWARD STORM.

Witnesses:
JOHN J. THOMPSON,
S. A. COOK.